United States Patent
Sitaraman et al.

(10) Patent No.: US 7,139,276 B1
(45) Date of Patent: Nov. 21, 2006

(54) LOAD SHARING BETWEEN L2TP TUNNELS

(75) Inventors: Aravind Sitaraman, Karnataka (IN); Purnam Anil Sheth, Livermore, CA (US)

(73) Assignee: Cisco Technology, Inc., San Jose, CA (US)

( * ) Notice: Subject to any disclaimer, the term of this patent is extended or adjusted under 35 U.S.C. 154(b) by 717 days.

(21) Appl. No.: 09/795,688

(22) Filed: Feb. 27, 2001

(51) Int. Cl.
*H04L 12/28* (2006.01)
*G06F 9/46* (2006.01)
*G06F 15/16* (2006.01)

(52) U.S. Cl. ..................................... 370/401; 718/105
(58) Field of Classification Search ............... 370/389, 370/469; 709/227, 238, 249
See application file for complete search history.

(56) References Cited

U.S. PATENT DOCUMENTS

| | | | |
|---|---|---|---|
| 4,644,532 A | 2/1987 | George et al. ................. 370/94 |
| 4,669,113 A | 5/1987 | Ash et al. .................... 379/221 |
| 4,896,319 A | 1/1990 | Lidinsky et al. | |
| 4,995,074 A | 2/1991 | Goldman et al. | |
| 5,014,265 A | 5/1991 | Hahne et al. .................. 370/60 |
| 5,115,427 A | 5/1992 | Johnson, Jr. et al. | |
| 5,159,592 A | 10/1992 | Perkins ...................... 370/85.7 |
| 5,239,537 A | 8/1993 | Sakauchi | |
| 5,265,245 A | 11/1993 | Nordstrom et al. ......... 395/600 |
| 5,274,634 A | 12/1993 | Babiarz ....................... 370/60 |
| 5,274,643 A | 12/1993 | Fisk ........................... 370/94.1 |
| 5,280,470 A | 1/1994 | Buhrke et al. ................ 370/13 |
| 5,305,311 A | 4/1994 | Lyles ........................... 370/60 |
| 5,347,511 A | 9/1994 | Gun ............................. 370/54 |
| 5,371,852 A | 12/1994 | Attanasio et al. ........... 395/200 |
| 5,406,643 A | 4/1995 | Burke et al. | |
| 5,408,469 A | 4/1995 | Opher et al. ................ 370/60.1 |
| 5,416,842 A | 5/1995 | Aziz ............................. 380/30 |
| 5,422,882 A | 6/1995 | Hiller et al. ................ 370/60.1 |
| 5,426,636 A | 6/1995 | Hiller et al. ................ 370/60.1 |
| 5,428,607 A | 6/1995 | Hiller et al. ................ 370/60.1 |
| 5,430,715 A | 7/1995 | Corbalis et al. .............. 370/54 |
| 5,437,013 A | 7/1995 | Rubin et al. ................ 395/200 |

(Continued)

FOREIGN PATENT DOCUMENTS

WO 99/23852 5/1999

OTHER PUBLICATIONS

Fogarty, K. et al., "Microsoft tunnels through the 'Net with new protocol", *WANs & Internetworking, Network World*, pp. 19-20, Mar. 18, 1990.

(Continued)

*Primary Examiner*—Huy D. Vu
*Assistant Examiner*—Clemence Han
(74) *Attorney, Agent, or Firm*—Thelen Reid & Priest LLP; John P. Schaub (57) ABSTRACT

A method for load sharing between tunnels connecting communication networks includes receiving a communication from a subscriber using the first communication network, determining tunnel selection criteria for the communication, selecting one of the at least one tunnel based on the tunnel selection criteria and forwarding the communication on the selected tunnel. The tunnel selection criteria indicate the basis for selecting one of the tunnels. An apparatus for load sharing between tunnels connecting communication networks includes a receiving interface to receive a communication from a subscriber using the first communication network, a tunnel selection criteria determiner to determine tunnel selection criteria for the communication, a tunnel selector to select one of the tunnels based on the tunnel selection criteria and a session forwarder to forward the communication on the selected tunnel. In one aspect of the invention, load sharing is performed between Layer 2 Tunneling Protocol (L2TP) tunnels.

81 Claims, 9 Drawing Sheets

U.S. PATENT DOCUMENTS

| | | | |
|---|---|---|---|
| 5,452,297 A | 9/1995 | Hiller et al. | 370/60.1 |
| 5,461,624 A | 10/1995 | Mazzola | |
| 5,469,556 A | 11/1995 | Clifton | |
| 5,510,777 A | 4/1996 | Pilc et al. | |
| 5,539,884 A | 7/1996 | Robrock, II | |
| 5,555,244 A | 9/1996 | Gupta et al. | 370/60.1 |
| 5,570,361 A | 10/1996 | Norizuki et al. | 370/60.1 |
| 5,578,955 A | 11/1996 | Matsue et al. | |
| 5,583,862 A | 12/1996 | Callon | 370/397 |
| 5,588,003 A | 12/1996 | Ohba et al. | |
| 5,602,918 A | 2/1997 | Chen et al. | 380/21 |
| 5,604,803 A | 2/1997 | Aziz | 380/25 |
| 5,617,417 A | 4/1997 | Sathe et al. | |
| 5,621,721 A | 4/1997 | Vatuone | 370/16 |
| 5,623,605 A | 4/1997 | Keshav et al. | 395/200.17 |
| 5,631,897 A | 5/1997 | Pacheco et al. | 370/237 |
| 5,642,515 A | 6/1997 | Jones et al. | 395/727 |
| 5,649,108 A | 7/1997 | Spiegel et al. | |
| 5,655,077 A | 8/1997 | Jones et al. | |
| 5,671,354 A | 9/1997 | Ito et al. | |
| 5,673,265 A | 9/1997 | Gupta et al. | |
| 5,684,950 A | 11/1997 | Dare et al. | |
| 5,689,566 A | 11/1997 | Nguyen | 380/25 |
| 5,708,812 A | 1/1998 | Van Dyke et al. | |
| 5,715,399 A | 2/1998 | Bezos | 395/227 |
| 5,717,690 A | 2/1998 | Peirce, Jr. et al. | 370/389 |
| 5,734,654 A | 3/1998 | Shirai et al. | 370/396 |
| 5,740,171 A | 4/1998 | Mazzola et al. | |
| 5,740,176 A | 4/1998 | Gupta et al. | |
| 5,740,371 A | 4/1998 | Wallis | 395/200.59 |
| 5,742,604 A | 4/1998 | Edsall et al. | |
| 5,745,708 A | 4/1998 | Weppler et al. | 395/299 |
| 5,764,636 A | 6/1998 | Edsall | |
| 5,768,519 A | 6/1998 | Swift et al. | |
| 5,796,732 A | 8/1998 | Mazzola et al. | |
| 5,802,290 A | 9/1998 | Casselman | 395/200.31 |
| 5,815,665 A | 9/1998 | Teper et al. | |
| 5,852,607 A | 12/1998 | Chin | 370/401 |
| 5,864,542 A | 1/1999 | Gupta et al. | 370/257 |
| 5,918,019 A | 6/1999 | Valencia | 395/200.57 |
| 5,944,824 A | 8/1999 | He | |
| 5,949,755 A | 9/1999 | Uphadya et al. | |
| 5,991,828 A | 11/1999 | Horie et al. | 710/8 |
| 5,999,514 A | 12/1999 | Kato | |
| 5,999,518 A | 12/1999 | Nattkemper | |
| 6,009,103 A | 12/1999 | Woundy | 370/401 |
| 6,011,910 A | 1/2000 | Chau et al. | |
| 6,021,496 A | 2/2000 | Dutcher et al. | |
| 6,023,474 A | 2/2000 | Gardner | |
| 6,026,441 A | 2/2000 | Ronen | 709/227 |
| 6,044,402 A | 3/2000 | Jacobson et al. | |
| 6,047,376 A | 4/2000 | Hosoe | |
| 6,061,650 A | 5/2000 | Malkin et al. | |
| 6,069,895 A | 5/2000 | Ayandeh | |
| 6,078,957 A | 6/2000 | Adelman et al. | |
| 6,081,508 A | 6/2000 | West et al. | |
| 6,081,518 A | 6/2000 | Bowman-Amuah | |
| 6,084,892 A | 7/2000 | Benash et al. | |
| 6,091,951 A | 7/2000 | Sturniolo et al. | 455/432 |
| 6,092,178 A | 7/2000 | Jindal et al. | |
| 6,092,196 A | 7/2000 | Reiche | |
| 6,094,437 A | 7/2000 | Loehndorf, Jr. et al. | |
| 6,108,708 A | 8/2000 | Iwata | |
| 6,115,468 A | 9/2000 | De Nicolo | |
| 6,118,785 A | 9/2000 | Araujo et al. | |
| 6,119,160 A | 9/2000 | Zhang et al. | 709/224 |
| 6,134,666 A | 10/2000 | De Nicolo | |
| 6,154,775 A | 11/2000 | Coss et al. | |
| 6,212,561 B1 | 4/2001 | Sitaraman et al. | |
| 6,236,655 B1 | 5/2001 | Caldara et al. | |
| 6,252,878 B1 | 6/2001 | Locklear, Jr. et al. | |
| 6,298,043 B1 | 10/2001 | Mauger et al. | |
| 6,301,229 B1 | 10/2001 | Araujo et al. | |
| 6,308,213 B1 | 10/2001 | Valencia | 709/229 |
| 6,396,838 B1 | 5/2002 | Palnati | |
| 6,400,716 B1 | 6/2002 | Munakata et al. | |
| 6,408,336 B1 | 6/2002 | Schneider et al. | |
| 6,412,003 B1 | 6/2002 | Melen | |
| 6,415,313 B1 | 7/2002 | Yamada et al. | |
| 6,430,152 B1 | 8/2002 | Jones et al. | |
| 6,434,156 B1 | 8/2002 | Yeh | |
| 6,438,612 B1 | 8/2002 | Ylonen et al. | |
| 6,446,200 B1 | 9/2002 | Ball et al. | |
| 6,456,623 B1 | 9/2002 | Kobayasi et al. | |
| 6,463,475 B1 * | 10/2002 | Calhoun | 709/227 |
| 6,466,976 B1 | 10/2002 | Alles et al. | |
| 6,498,845 B1 | 12/2002 | Martz et al. | |
| 6,507,577 B1 | 1/2003 | Mauger et al. | |
| 6,519,254 B1 | 2/2003 | Chuah et al. | |
| 6,522,627 B1 | 2/2003 | Mauger | |
| 6,526,033 B1 | 2/2003 | Wang et al. | |
| 6,542,919 B1 | 4/2003 | Wendorf et al. | |
| 6,597,689 B1 | 7/2003 | Chiu et al. | |
| 6,609,153 B1 | 8/2003 | Salkewicz | |
| 6,614,809 B1 * | 9/2003 | Verma et al. | 370/469 |
| 6,615,358 B1 | 9/2003 | Dowd et al. | |
| 6,651,096 B1 | 11/2003 | Gai et al. | |
| 6,654,792 B1 * | 11/2003 | Verma et al. | 709/208 |
| 6,665,273 B1 | 12/2003 | Goguen et al. | |
| 6,665,305 B1 | 12/2003 | Weismann | |
| 6,717,944 B1 | 4/2004 | Bryden et al. | |
| 6,741,599 B1 | 5/2004 | Dunn et al. | |
| 6,785,228 B1 | 8/2004 | Vandette et al. | |
| 2002/0116501 A1 * | 8/2002 | Ho et al. | 709/227 |

OTHER PUBLICATIONS

Mathieson, C. et al., "High Speed Serial Communications for Control Systems", 0-7803-1203-1/93 *IEEE*, pp. 1826-1828, (1993).

David Allan, "Semi Permanent PPP Connections (sP$^4$)", Nortel Networks, pp. 1-7, Feb. 8-11, 2000.

Ascend Communications, "MultiVPN from Ascend Communications: Breaking Down the Barriers to VPNs", White Paper, 1998.

Mecklermedia Corporation, "Tunneling", printed from http://webopedia.internet.com/TERM/t/tunneling.html, 1998.

Rigney et al., Remote Authentication Dial in User Service (Radius), Network Working Group, pp. 1-57, Apr. 1997.

David R. Safford et al., "Secure RPC Authentication (SRA) for TELNET and FTP", USENIX Association, 1993.

Christoph L. Schuba et al., "Countering Abuse of Name-Based Authentication", COAST Laboratory, Department of Computer Sciences, Purdue University, date unknown, 21 pages.

Valencia et al, "Layer Two Tunneling Protocol L2TP", PPP Working Group, pp. 1-93, May 1998.

Xu et al., "Design and Evaluation of a High-Performance ATM Firewall Switch and its Applications", IEEE Journal on Selected Areas in Communications, vol. 17, No. 6, pp. 1190-1200, Jun. 1999.

Carrel, D. et al., "The TACACS+ Protocol, Version 1.78", Cisco Systems, Inc., printed from ftp://ftp-eng.cisco.com/gdweber/tax-rfc.1.78 txt on Oct. 23, 2000.

"Cisco Asymmetric Digital Subscriber Line Services Architecture", Cisco Systems, White Paper, printed from http://www.cisco.com/warp/public/cc/so/neso/dsso/global/adsl_wp.htm on Sep. 27, 2000.

Cisco, Product Bulletin—No. 1120, Cisco 6400 Universal Access Concentrator, printed from http://www.cisco.com/warp/public/cc/pd/as/6400/prodlit/1120_pp.htm on Oct. 4, 2000.

Cisco, "Layer 2 Tunnel Protocol", Release 12.0(1)T and 11.3(5)AA, 53 pages.

Cisco, "Cisco 6400 Series Universal Access Concentrator", printed from http://www.cisco.com/warp/public/cc/pd/as/6400/prodlit/6400_ds.htm on Sep. 27, 2000.

"L2TP", 1998, Mecklermedia Corporation, printed from http://www.webopedia.internet.com/TERM/L/L2TP/html.

* cited by examiner

LOAD SHARING BETWEEN L2TP TUNNELS

CROSS REFERENCE TO RELATED APPLICATIONS

This application is related to the following:

U.S. patent application Ser. No. 09/488,394, filed Jan. 20, 2000 in the name of inventors Aravind Sitaraman, Aziz Abdul, Bernard Janes, Dennis Cox, John Joyce, Peter Heitman, Shujin Zhang and Rene Tio, entitled "System and Method for Identifying a Subscriber for Connection to a Communication Network", commonly assigned herewith.

U.S. patent application Ser. No. 09/488,395, filed Jan. 20, 2000 in the name of inventors Aravind Sitaraman, Dennis Cox, John Joyce and Shujin Zhang, entitled "System and Method for Determining Subscriber Information", commonly assigned herewith.

U.S. patent application Ser. No. 09/712,005, filed Nov. 13, 2000 in the name of inventors Purnam Sheth, Aravind Sitaraman, Charles Yager and Gregory Burns, entitled "PPP/L2TP Domain Name Pre-Authorization", commonly assigned herewith.

U.S. patent application Ser. No. 09/712,780, filed Nov. 13, 2000 in the name of inventors Purnam Sheth, Aravind Sitaraman, Charles Yager and Gregory Burns, entitled "PPP Domain Name and L2TP Tunnel Selection Configuration Override", commonly assigned herewith.

FIELD OF THE INVENTION

The present invention relates to the field of data communications. More particularly, the present invention relates to a method and apparatus for load sharing between L2TP tunnels.

BACKGROUND OF THE INVENTION

Computer networking capabilities of a home personal computer (PC) are typically provided by telephone companies (Telcos) or commercial Internet Service Providers (ISPs) who operate network access points along the information superhighway. It is through these network access points that the user is able to connect with public domains, such as the Internet, and private domains, such as an intra-company computer network of the user's employer.

In the wholesale Internet access environment, the network access provider (NAP) and the network service provider (NSP) are not necessarily the same entity. Telcos and other wholesale ISPs are typical NAPs, who operate gateways (network access servers, access routers, or the like) in their points of presence (PoPs), and provide local loop access services to PCs. NSPs are typically the customers of NAPs, who are allowed to use the NAP's gateways to provide their Internet Protocol (IP)-based services, such as Internet access, network access, or voice over IP (VoIP) services to the PCs.

Figure 1:
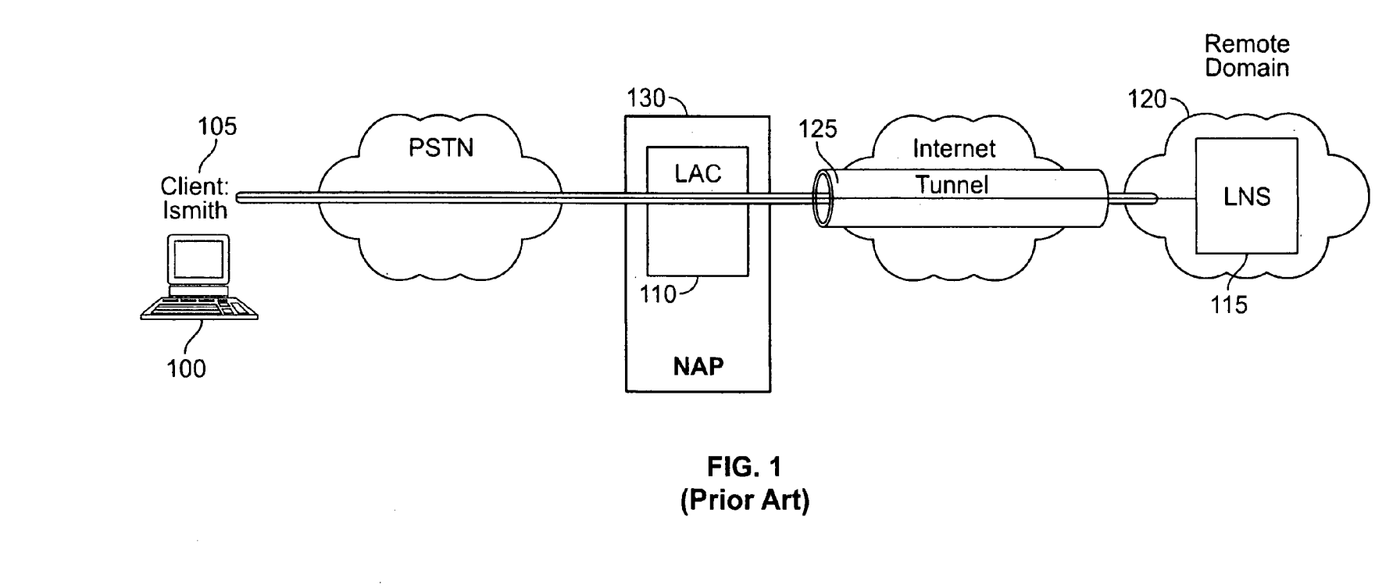
FIG. 1 is a block diagram that illustrates a L2TP tunnel and how a user typically connects to a remote domain.

FIG. 1 illustrates Layer 2 Tunneling Protocol (L2TP). L2TP tunneling is a common service architecture for Point-to-Point (PPP) clients currently available at NAPs. In the typical L2TP tunneling environment, a PC 100 of a PPP client 105 starts a PPP session by dialing into a L2TP access concentrator (LAC) 110 located at the NAP's point of presence (PoP). The LAC 110 exchanges PPP messages with the client's PC 100 and communicates with a L2TP network server (LNS) 115 of a remote domain 120 such as an ISP or a private company. The LNS 115 is typically a home gateway (HGW) of the remote domain 120. The communication between the LAC 110 and the LNS 115 is by way of L2TP requests and responses. When a L2TP tunnel 125 is set up, the LAC 110 forwards the PPP session over the L2TP tunnel 125 to the LNS 115. Data packets in the PPP session are encapsulated into L2TP frames that are destined for the IP address of the LNS 115.

The LNS 115 is a termination point of the L2TP tunnel 125. The LNS 115 accepts L2TP frames, strips the L2TP encapsulation, and processes the incoming PPP frames for the appropriate interface. The PPP frames are processed and passed to higher layer protocols, i.e., the PPP session is terminated at the LNS 115. The PPP session termination requires and includes user authentication via a Remote Authentication Dial-In User Service (RADIUS) or other means. An authenticated PPP client then receives an IP address, a Domain Name System (DNS) address, and IP-based services that the client contracted. These are forwarded back to the client over the L2TP tunnel 125 through the LAC 110.

The L2TP passes protocol-level (or Data Link-level) packets through the virtual tunnel between the endpoints of a point-to-point connection, i.e., the client's PC 100 and the LNS 115. The L2TP is suitable for virtual private networking (VPN), in which users can dial into a NAP's network access server and join a private (typically corporate) network that is remote from the NAP's PoP.

Figure 2:
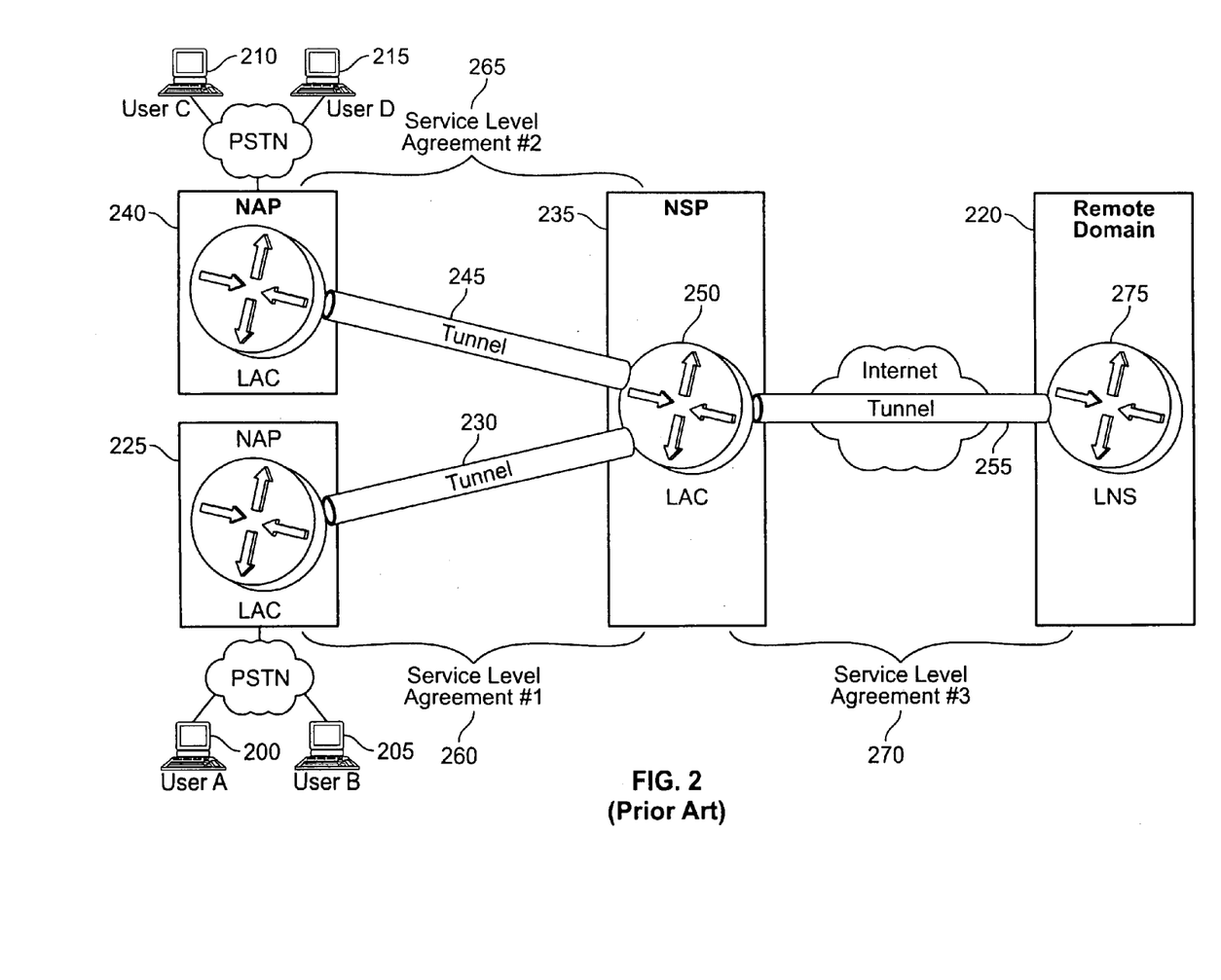
FIG. 2 is a block diagram that illustrates a L2TP service architecture in which the NAP and NSP are different entities.

FIG. 2 is a block diagram that illustrates a L2TP service architecture in which the NAP and NSP are different entities. Users 200–215 represent authorized users of a network at remote domain 220. NAP 225 provides network access to user A 200 and user B 205 and tunnels the PPP sessions via tunnel 230 to LAC 250. NAP 240 provides network access to user C 210 and user D 215 and tunnels the PPP sessions via tunnel 245 to LAC 250. NSP 235 may also provide services for other remote domains (not shown in FIG. 2). LAC 250 aggregates tunnels 245 and 230 into a single tunnel 255 to the LNS 275 at remote domain 220.

A typical service level agreement (SLA) specifies a minimum bandwidth to be provided during specified times of the day or week together with pricing information for the provision of such services. As shown in FIG. 2, NAP 225 and NAP 240 have separate SLAs 260, 265 with NSP 235. Additionally, NSP 235 has a third SLA 270 with the remote domain 220. However, since sessions going to the remote domain 220 use the same tunnel, they are accorded the same level of service for that interface.

This approach has a number of drawbacks. First, placing all L2TP sessions for a particular remote domain on single tunnel increases the risk that all sessions will be dropped if the tunnel drops. This in turn increases the risk of violating a SLA. Second, placing all L2TP sessions for a particular remote domain on a single tunnel accords the same level of service to all sessions, regardless of any SLAs. Third, concentrating sessions over a single interface typically results in relatively inefficient resource utilization.

What is needed is a solution that minimizes the risk of putting all tunneled sessions to a remote domain on a single tunnel. A further need exists for such a solution that enables differentiated service for each tunneled session. Yet another need exists for such a solution that provides relatively efficient utilization of resources.

BRIEF DESCRIPTION OF THE INVENTION

A method for load sharing between tunnels connecting communication networks includes receiving a communication from a subscriber using the first communication network, determining tunnel selection criteria for the communication, selecting one of the at least one tunnel based on the tunnel selection criteria and forwarding the communication on the selected tunnel. The tunnel selection criteria indicate the basis for selecting one of the tunnels. An apparatus for load sharing between tunnels connecting communication networks includes a receiving interface to receive a communication from a subscriber using the first communication network, a tunnel selection criteria determiner to determine tunnel selection criteria for the communication, a tunnel selector to select one of the tunnels based on the tunnel selection criteria and a session forwarder to forward the communication on the selected tunnel. In one aspect of the invention, load sharing is performed between Layer 2 Tunneling Protocol (L2TP) tunnels.

BRIEF DESCRIPTION OF THE DRAWINGS

The accompanying drawings, which are incorporated into and constitute a part of this specification, illustrate one or more embodiments of the present invention and, together with the detailed description, serve to explain the principles and implementations of the invention.

In the drawings.

DETAILED DESCRIPTION OF A PREFERRED EMBODIMENT

Embodiments of the present invention are described herein in the context of a method and apparatus for load sharing between L2TP tunnels. Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the present invention as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In the context of the present invention, the term "network" includes local area networks, wide area networks, the Internet, cable television systems, telephone systems, wireless telecommunications systems, fiber optic networks, ATM networks, frame relay networks, satellite communications systems, and the like. Such networks are well known in the art and consequently are not further described here.

In accordance with one embodiment of the present invention, the components, processes and/or data structures may be implemented using C or C++ programs running on high performance computers (such as an Enterprise 2000™ server running Sun Solaris™ as its operating system. The Enterprise 2000™ server and Sun Solaris™ operating system are products available from Sun Microsystems, Inc. of Mountain View, Calif.). Different implementations may be used and may include other types of operating systems, computing platforms, computer programs, firmware, computer languages and/or general-purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein.

The authentication, authorization and accounting (AAA) service performs user authentication, user authorization and user accounting functions. It may be a Cisco ACS™ product such as Cisco Secure™, available from Cisco Systems, Inc. of San Jose, Calif., or an equivalent product. In accordance with a presently preferred embodiment of the present invention, the Remote Authentication Dial-In User Service (RA- DIUS) protocol is used as the communication protocol for carrying AAA information. RADIUS is an Internet standard track protocol for carrying authentication, authorization, accounting and configuration information between devices that desire to authenticate their links and a shared AAA or AAA proxy service. Those of ordinary skill in the art will realize that other authentication protocols such as TACACS+ or DIAMETER can be used as acceptable authentication communications links between the various communications devices that encompass the data communications network and still be within the inventive concepts disclosed herein.

According to embodiments of the present invention, tunneled sessions to a remote domain are divided among multiple tunnels. Tunnel selection may be based on a static tunnel-mapping algorithm, in which a session is allocated to a tunnel without regard to the current capacity of each tunnel to the remote domain. Alternatively, a load factor for available tunnels to the remote domain may be considered in determining which tunnel to use. The load factor may be based upon parameters such as time of day, day of week, quality of service level and subscribed network bandwidth.

Figure 3:
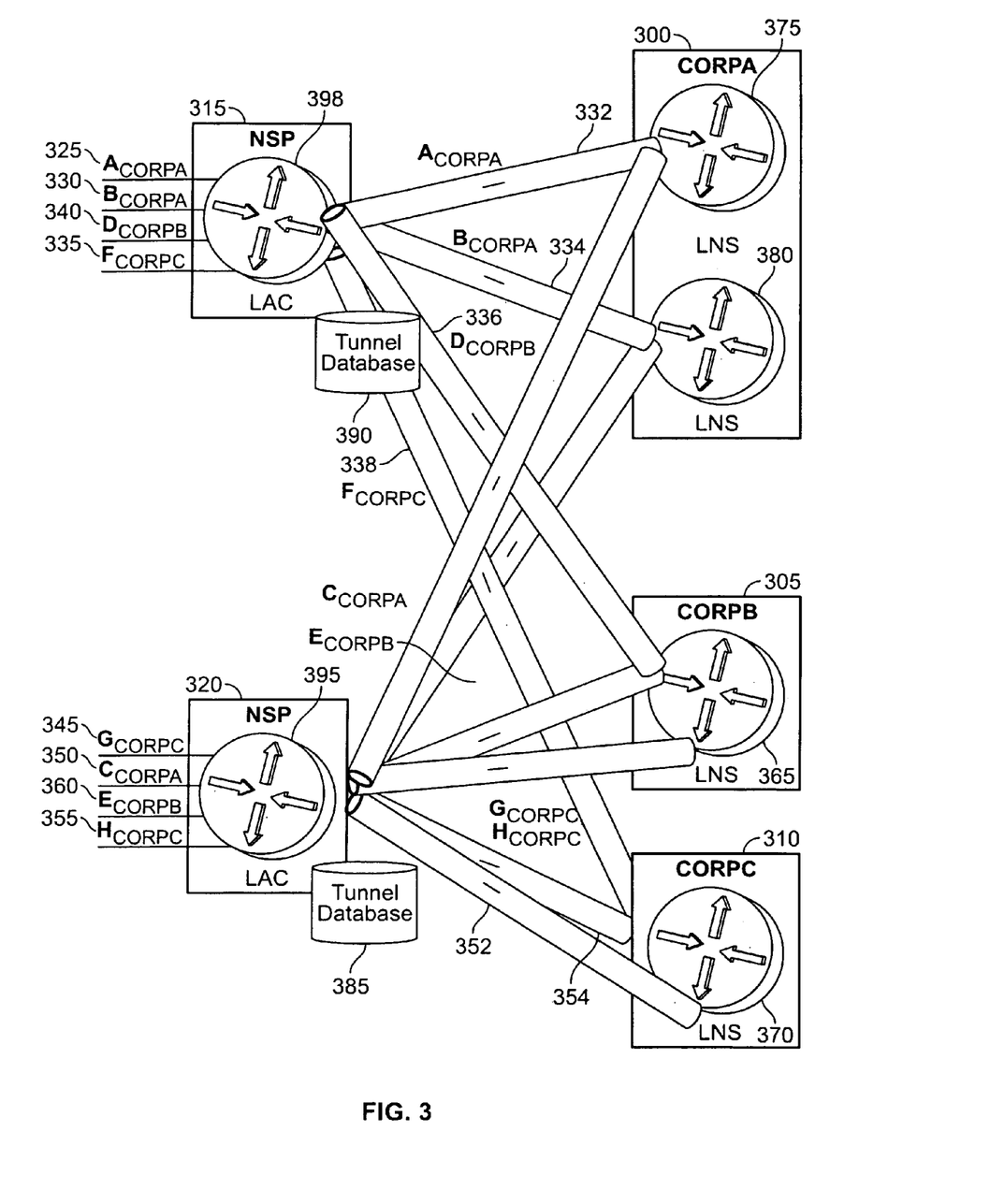
FIG. 3 is a block diagram that illustrates a system for load sharing between L2TP tunnels in accordance with one embodiment of the present invention.

FIG. 3 is a block diagram that illustrates a system for load sharing between L2TP tunnels in accordance with one embodiment of the present invention. CorpA 300, CorpB 305 and CorpC 310 are remote domains with respect to NSP 315 and NSP 320. NSP 315 tunnels sessions for user $A_{CorpA}$ 325, an employee of CorpA 300. NSP 315 also tunnels sessions for users $B_{CorpA}$ 330, $D_{CorpB}$ 340 and $F_{CorpC}$ 335. NSP 320 tunnels sessions for user $G_{CorpC}$ 345, $C_{CorpA}$ 350, $E_{CorpB}$ 360, and $H_{CorpC}$ 355. NSPs 315 and 320 have at least two tunnels to CorpA 300, CorpB 305 and CorpC 310. CorpB 305 and CorpC 310 each have a single LNS 365, 370, while CorpA 300 has a LNS 375, 380 for each ingress tunnel. Each NSP may have more than one LAC and each remote domain may have more than one LNS. Tunnel databases 385 and 390 include tunnel selection criteria and tunnel parameters. Tunnel databases 385 and 390 include tunnel selection criteria for remote domains 300, 305 and 310. Tunnel database 385 includes parameters for tunnels originating with LAC 395 and tunnel database 390 includes parameters for tunnels originating with LAC 398.

Figure 4:
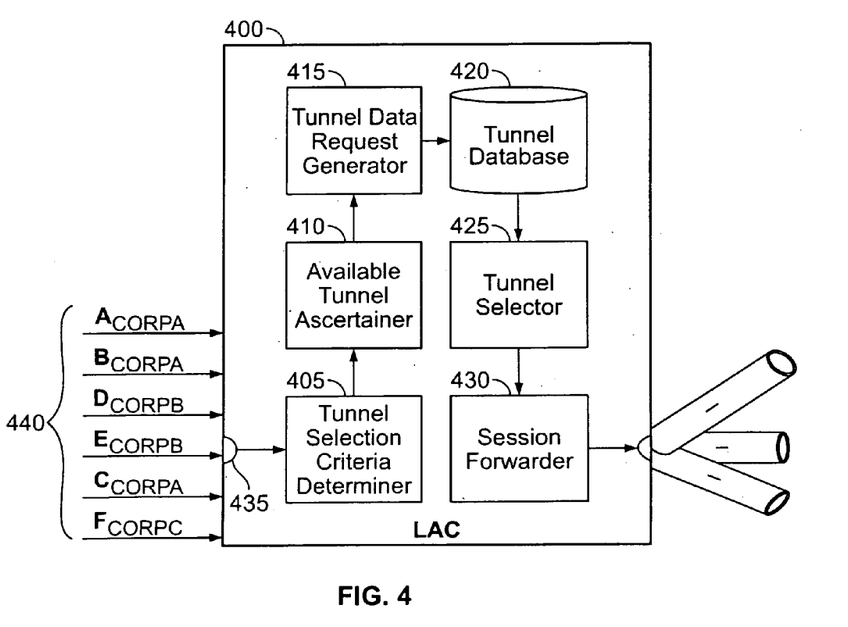
FIG. 4 is a block diagram that illustrates an apparatus for load sharing between L2TP tunnels in accordance with one embodiment of the present invention.

Turning now to FIG. 4, a block diagram that illustrates an apparatus for load sharing between L2TP tunnels in accordance with one embodiment of the present invention is presented. FIG. 4 provides more detail for LACs 395 and 398 in FIG. 3. LAC 400 includes a tunnel selection criteria determiner 405, an available tunnel ascertainer 410, a tunnel data request generator 415, a tunnel database 420, a tunnel selector 425 and a session forwarder 430. The LAC 400 may be implemented using a Cisco 6400 (or an equivalent), available from Cisco Systems, Inc. of San Jose, Calif.

The tunnel selection criteria determiner 405 determines the criteria to apply in selecting a tunnel received by receiving interface 435. For example, the tunnel selection criteria determiner 405 may indicate that tunnels should be selected to evenly distribute sessions regardless of a tunnel's available bandwidth, or to select a tunnel having the most available bandwidth. The available tunnel ascertainer 410 determines which tunnels to a particular remote domain are available. The tunnel data request generator 415 generates one or more tunnel data requests to obtain the information requested by the available tunnel ascertainer 410. The tunnel database 420 stores parameters for each tunnel originating with LAC 400. The tunnel database 420 also stores tunnel selection criteria for each remote domain. Alternatively, tunnel parameters and tunnel selection criteria may be stored in separate databases. The tunnel selector 425 selects one of the tunnels leading to the remote domain and session forwarder 430 forwards the session received by receiving interface 435 to the remote domain via the tunnel selected by tunnel selector 425.

In operation, receiving interface 435 receives a session from a first communication network 440 and forwards the session to tunnel selection criteria determiner 405. The tunnel selection criteria determiner 405 determines the criteria to use in selecting a tunnel. According to a preferred embodiment, the selection criteria for a particular domain is obtained from a database upon receiving a first session destined for the remote domain. If the tunnel selection criteria are independent of tunnel loading, the tunnel selector 425 selects the tunnel indicated by the selection criteria determiner 405. If the tunnel selection determiner 405 requires tunnel-loading parameters, available tunnel ascertainer 410 ascertains the available tunnels to the remote domain. Tunnel selector 425 selects one of the tunnels to the remote domain by applying the tunnel selection criteria to the tunnel parameters and session forwarder 430 forwards the session received by receiving interface 435 to the remote domain via the tunnel selected by tunnel selector 425.

Figure 5:
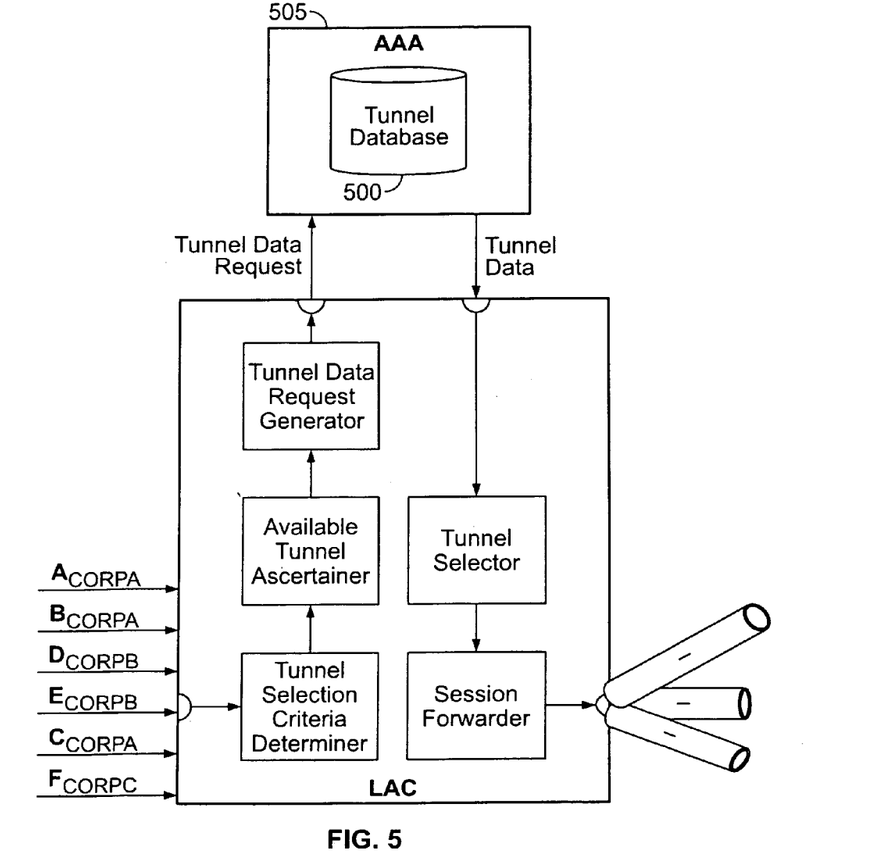
FIG. 5 is a block diagram that illustrates an apparatus for load sharing between L2TP tunnels in accordance with one embodiment of the present invention.

Turning now to FIG. 5, a block diagram that illustrates an apparatus for load sharing between L2TP tunnels in accordance with one embodiment of the present invention is presented. FIG. 5 is similar to FIG. 4, except tunnel data is maintained in an external database 500. According to one embodiment of the present invention, the tunnel data is stored in an AAA server 505.

Figure 6:
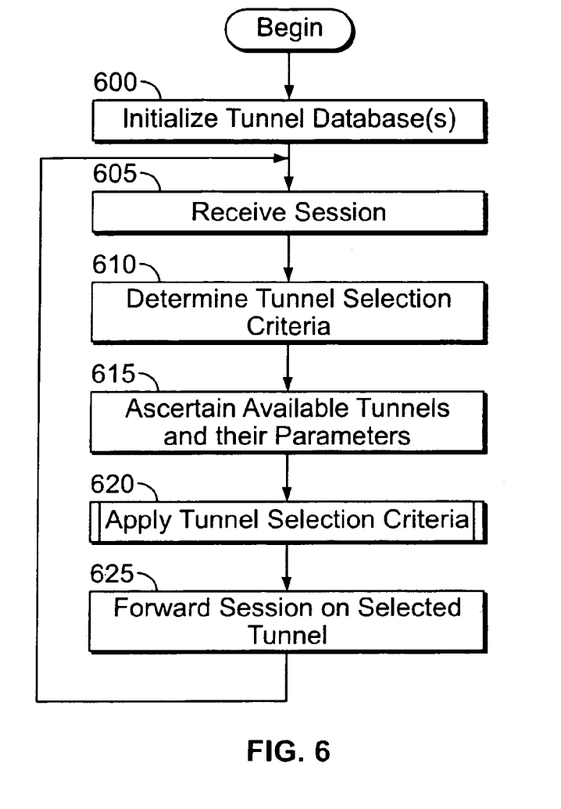
FIG. 6 is a flow diagram that illustrates a method for load sharing between L2TP tunnels to a remote domain in accordance with one embodiment of the present invention.

Turning now to FIG. 6, a flow diagram that illustrates a method for load sharing between L2TP tunnels to a remote domain in accordance with one embodiment of the present invention is presented. At 600, a tunnel database is initialized with tunnel selection criteria for each remote domain and with tunnel parameter values for each tunnel. For example, tunnel database 385 in FIG. 3 is initialized with tunnel selection criteria for remote domains 300, 305 and 310. The selection criteria for remote domain 310 may indicate sessions should be allocated randomly, while the selection criteria for domains 300 and 305 may indicate sessions should be allocated based upon available bandwidth. In this example, tunnel database 385 also includes tunnel parameters needed for the particular tunnel selection criteria. The selection criteria for remote 310 domain require a list of tunnels to select from (e.g. tunnels 352 and 354). The selection criteria for remote domains 300 and 305 require additional parameters such as the maximum number of sessions for each tunnel and the number of sessions currently allocated to each tunnel.

Referring again to FIG. 6, at 605, a session is received. At 610, the tunnel selection criteria for the remote domain are determined. The selection criteria may be obtained from a local database or from a AAA server or the like. Various types of tunnel selection criteria are described below in more detail. At 615, a database is checked to ascertain the available tunnels to the remote domain and their respective parameters. For example, any tunnel that is "down," is not operational, or is operating over a certain percentage of its capacity could be considered "not available". One or more available tunnels may then be available at 615. At 620, the tunnel selection criteria obtained at reference numeral 610 is applied to the tunnel parameters for the available tunnels determined at reference numeral 615 to select a tunnel. At 625, the session is forwarded on the selected tunnel. Processing continues at 605 when another session is received.

According to embodiments of the present invention, tunnel selection may be performed statically or dynamically. In static tunnel selection, sessions are allocated to a particular tunnel without regard to current tunnel parameters. Referring again to FIG. 3, users $A_{CorpA}$ 325, $B_{CorpA}$ 330, $D_{CorpB}$ 340 and $F_{CorpC}$ 335 may be allocated to tunnels 332, 334, 336 and 338, respectively. The identification of which subscribers are allocated to which tunnels may be placed in a local database, or remotely in an AAA server or the like. When a session is received, the NSP identifies the user by parsing the fully qualified domain name ("FQDN") (e.g., joe@corpa.com) supplied by the user, or by using some other known mechanism. The NSP accesses a database that includes the user identification and a tunnel ID and uses the indicated tunnel for the session.

As mentioned above, the tunnel selection criteria may indicate that tunnels should be selected pseudo-randomly, or with a weighted random selection so that those with more available capacity are selected more often, or with any other suitable selection algorithm as will now be apparent to those of ordinary skill in the art. More examples of selection criteria are presented below with reference to FIGS. 7–14.

Figure 7:
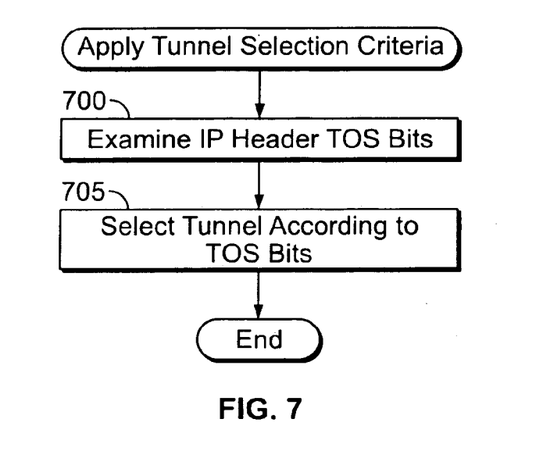
FIG. 7 is a flow diagram that illustrates selecting a tunnel based upon Internet Protocol (IP) packet header Type of Service (ToS) bits in accordance with one embodiment of the present invention.

In accordance with one embodiment of the present invention, the three Precedence bits (the three highest order or most significant bits of the 8-bit Type of Service (ToS)/ Differentiated Services Field of the IP packet header) are used to select a tunnel for a session. This is illustrated in FIG. 7. At 700, the ToS bits are examined. At 705, a tunnel is selected based upon the ToS bits. For example, a session whose ToS bits indicate a relatively high level of service may be allocated to a special tunnel for sessions requiring a similar of service. Alternatively, the session may be allocated to any other tunnel capable of providing the required level of service.

Those of ordinary skill in the art will realize that the particular bits used are not particularly critical, for example, the CoS (Class of Services) bits of an IEEE 802.1q frame could be used as could the CoS bits in an Inter-Switch Link (ISL) frame. Other bits or fields could also be designated to carry the type of service information. A 3-bit ToS permits up to 8 levels of service. Larger bit fields would be used if desired.

Figure 8:
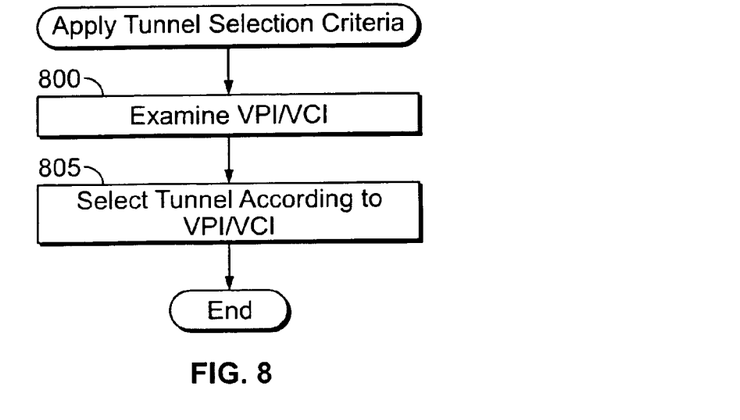
FIG. 8 is a flow diagram that illustrates selecting a tunnel based upon a Virtual Path Identifier (VPI)/Virtual Circuit Identifier (VCI) pair in accordance with one embodiment of the present invention.

According to another embodiment of the present invention, tunnel selection is based upon a VPI/VCI pair associated with the received session. This is illustrated in FIG. 8. As is known to those of ordinary skill in the art, a virtual circuit or channel (VC) is a logical circuit created to ensure reliable communication between two network devices. A VC is defined by a Virtual Path Identifier (VPI)/Virtual Channel Identifier (VCI) pair. According to this embodiment of the present invention, at 800, a VPI/VCI pair associated with the received session is examined. At 805, a tunnel is selected based upon the VPI/VCI pair. For example, a session whose VPI/VCI pair indicates a relatively high level of service may be allocated to a special tunnel for sessions requiring a similar of service. Alternatively, the session may be allocated to any other tunnel capable of providing the required level of service.

Figure 9:
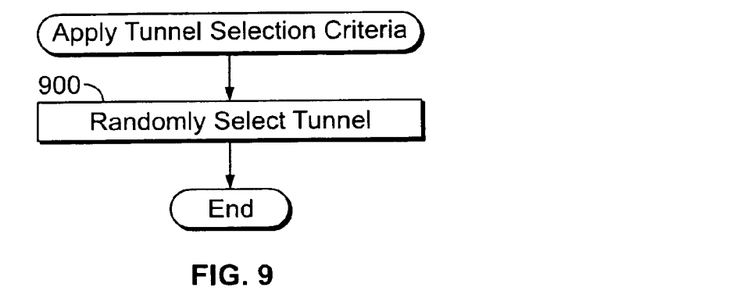
FIG. 9 is a flow diagram that illustrates selecting a tunnel based upon a pseudo-random process in accordance with one embodiment of the present invention.

According to another embodiment of the present invention, a tunnel is selected based upon a pseudo-random process. This is illustrated in FIG. 9. For example, suppose a LAC has ten tunnels to a remote domain and each tunnel is identified by a number from one to ten. A random number generator is used to generate a number from one to ten and the tunnel associated with the generated number is selected.

According to another embodiment of the present invention, the time at which a session is received is used to select a tunnel. A remote domain may have multiple LNSs in various parts of the world. The workload for each LNS may vary depending upon the time of day, the day of the week, or both. Thus, allocating a session to tunnel associated with a LNS at an "off-hours" site results in a relatively efficient utilization of resources. This embodiment is described below in more detail with reference to FIG. 10.

Figure 10:
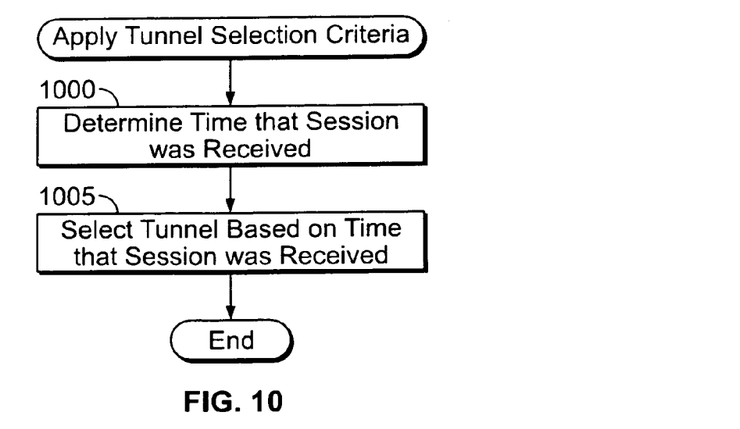
FIG. 10 is a flow diagram that illustrates selecting a tunnel based upon the time at which a session is received in accordance with one embodiment of the present invention.

Turning now to FIG. 10, a flow diagram that illustrates a method for selecting a tunnel based upon the time at which a session is received in accordance with one embodiment of the present invention is presented. At 1000, the time at which the session is received is determined. At 1005, the tunnel is selected based upon the time the session is received. For example, suppose a LAC that receives a session is in country A and that the remote domain has LNSs in country A and country B. Country A is in a time zone that is 12 hours ahead of country B. The LAC receives a session at 10 AM on a Monday in the LAC's time zone, which is 10 PM on a Sunday in Country B. In this case, the LNS in Country A will likely have a higher workload than CorpA's LNS in country B. This information is accounted for in a tunnel parameter value.

According to embodiments of the present invention, the available bandwidth of tunnels and associated interfaces is used either alone or in combination with other parameters to dynamically select a tunnel. The selection criteria are applied to the various tunnel parameters to create a loading factor. The tunnel with the best loading factor is selected. These embodiments are illustrated below with reference to FIGS. 11–14.

Figure 11:
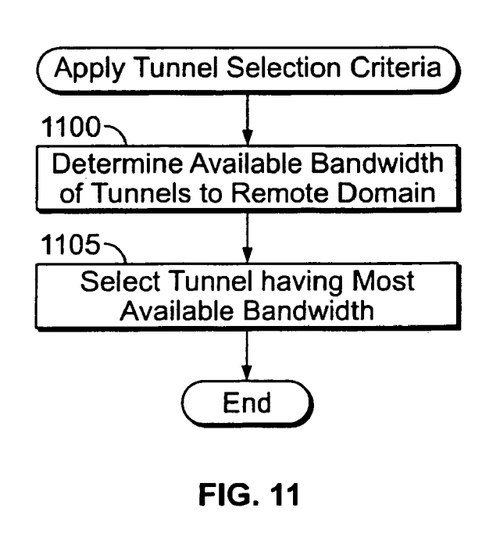
FIG. 11 is a flow diagram that illustrates selecting a tunnel based upon available bandwidth in accordance with one embodiment of the present invention.

According to one embodiment of the present invention, the available bandwidth of all tunnels going to a remote domain is used to select a tunnel. This is illustrated in FIG. 11. At 1100, the available bandwidth of all tunnels going to the remote domain is determined. At 1105, the tunnel having the most available bandwidth is selected. The available bandwidth may be expressed, by way of example, as the maximum number of sessions for a tunnel minus the number of active sessions. The maximum number may be hard-coded, or based on the number of sessions the tunnel has recently been able to support while maintaining a certain level of service.

The load factor information may be of a number of types, but essentially is an indicator of the available capacity of the particular tunnel, weighted by various tunnel parameters. In this manner it is now relatively straightforward to program a LAC to load balance among the multiple instances of tunnels for a remote domain given in the database.

For example, one way to implement the system illustrated in FIG. 3 is to provision $Corp_A$ 300 with a number of tunnels for handling sessions and to set the selection criteria such that the tunnel with the most available bandwidth is selected. Suppose each tunnel is capable of handling up to "X" sessions and currently has two active sessions. In this case, its load factor is X-2. The LAC at the NSP's domain can keep track of all sessions passed to these respective tunnels so that it can avoid allocating more sessions than any particular tunnel can handle. It can also load balance among multiple instances of the tunnels so that the load is shared more or less equally. This can be done pseudo randomly or in any other practical manner. Now the load can be balanced and tunnels that are unable to handle sessions can be avoided to minimize the risk of a dropped tunnel.

According to one embodiment of the present invention, the available bandwidth is weighted by the processing capacity of the LNS CPU. For example, suppose tunnel A is currently handling 10 sessions and is associated with a remote domain LNS having a relatively high capacity CPU. Suppose also that tunnel B is currently handling the same number of sessions and is associated with a remote domain LNS having a relatively low capacity CPU. In this case, tunnel A is better equipped to handle an additional session than tunnel B. This information is accounted for in the tunnel parameters for tunnel A and tunnel B.

Figure 12:
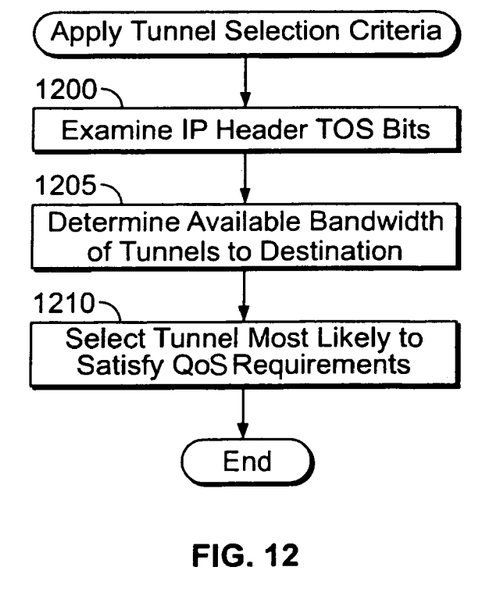
FIG. 12 is a flow diagram that illustrates selecting a tunnel based upon available bandwidth and IP header ToS bits in accordance with one embodiment of the present invention.

According to one embodiment of the present invention, a tunnel is selected based upon available bandwidth and IP header ToS bits. This is illustrated in FIG. 12. At 1200, the ToS bits for an IP header associated with a session is examined. At 1205, the available bandwidth of tunnels going to the remote domain is determined. At 1210, the tunnel having an amount of available bandwidth most appropriate for the required level of service is selected.

Figure 13:
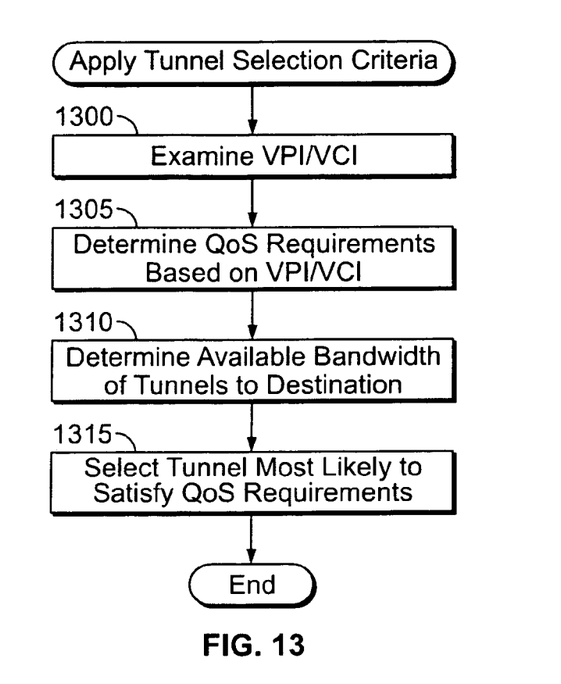
FIG. 13 is a flow diagram that illustrates selecting a tunnel based upon available bandwidth and a VPI/VCI pair in accordance with one embodiment of the present invention.

Similarly, a VPI/VCI pair may also be used in conjunction with available bandwidth to select a tunnel in accordance with another embodiment of the present invention. Referring to FIG. 13, at 1300, a VPI/VCI pair associated with a session is examined. At 1305, a level of service is determined based upon the VPI/VCI pair. At 1310, the available bandwidth of tunnels going to the remote domain is determined. At 1315, the tunnel having an amount of available most appropriate for the level of service is selected.

Figure 14:
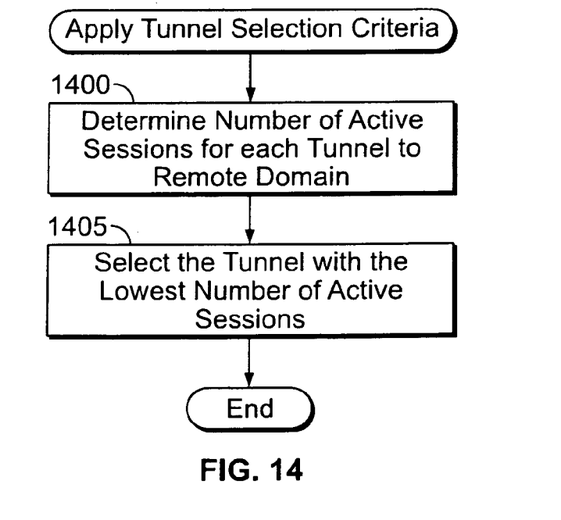
FIG. 14 is a flow diagram that illustrates selecting a tunnel to even the distribution of sessions among tunnels in accordance with one embodiment of the present invention.

According to another embodiment of the present invention, a tunnel is selected to provide a relatively even distribution of sessions among tunnels, regardless of tunnel capacity. This is illustrated in FIG. 14. At 1400, the number of active sessions for each tunnel to the remote domain is determined. At 1405, the tunnel having the smallest number of active sessions is selected. For example, suppose tunnels A and B go to the remote domain and that tunnel A has 10 active sessions while tunnel B has 5 active sessions. According to this embodiment of the present invention, each new session is added to tunnel B until tunnel B has more active sessions than tunnel A.

A LAC having the capabilities described above can be further used to allow the NSP to behave in a fundamentally different manner than before. Now the NSP can differentiate among computer users. For example, in the case of Joe@ ISP.net who is an authorized user of CorpA, the NSP can identify the user at the time the NSP receives his session, look up the details of the SLA with that user, and determine which tunnel to the remote domain can best service the session given the requirements of the SLA.

An example of this mode of operation is now presented with reference to FIG. 3. A PoP (Point of Presence) of a NAP is contacted by a user via a PPP connection or another suitable connection. The PPP session is directed to a NSP. The NSP seeks to identify the user with the local AAA server. Instead of performing standard authentication, the AAA server can now perform a query to its tunnel database to determine the "best" tunnel that fits the SLA between the NAP and the NSP as well as the SLA between the NSP and the remote domain. Assuming that tunnel between the NSP and the remote domain fits the parameters, the session is allocated to the tunnel.

While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims.

What is claimed is:

1. A method for load sharing between tunnels connecting communication networks, the method comprising:

initializing a tunnel database that includes tunnel selection criteria for at least one tunnel connecting a first communication network to at least one communication network;

after said initializing, receiving a communication from a subscriber using said first communication network;

determining said tunnel selection criteria for said communication, said tunnel selection criteria indicating the basis for selecting one of said at least one tunnel;

ascertaining one or more available tunnels to a remote domain for said communication;

selecting one of said one or more available tunnels based on said tunnel selection criteria; and forwarding said communication on the selected tunnel.

2. The method of claim 1 wherein said communication comprises a Point-to-Point Protocol (PPP) session.

3. The method of claim 2 wherein said tunnels comprise L2TP tunnels.

4. A method for load sharing between tunnels connecting communication networks, the method comprising:

receiving a communication from a subscriber using a first communication network;

determining tunnel selection criteria for said communication, said tunnel selection criteria indicating the basis for selecting one of at least one tunnel connecting said first communication network to at least one communication network comprising a remote domain, said tunnel selection criteria stored in a previously initialized tunnel database;

selecting one of said at least one tunnel based on said tunnel selection criteria; and forwarding said communication on the selected tunnel.

5. The method of claim 4 wherein said communication comprises a Point-to-Point Protocol (PPP) session.

6. The method of claim 5 wherein said tunnels comprise L2TP tunnels.

7. The method of claim 6 wherein said selecting further comprises:

examining Type of Service (ToS) bits associated with said PPP session; and selecting a tunnel based on said ToS bits.

8. The method of claim 6 wherein said selecting further comprises:

examining a Virtual Path Identifier (VPI)/Virtual Channel Identifier (VCI) pair associated with said PPP session; and selecting a tunnel based on said VPI/VCI pair.

9. The method of claim 6 wherein said selecting further comprises randomly selecting a tunnel connected to said remote domain.

10. The method of claim 6 wherein said selecting further comprises:

determining the available bandwidth for at least one tunnel to said remote domain; and selecting a tunnel to said remote domain having the most available bandwidth.

11. The method of claim 6 wherein said selecting further comprises:

determining a time at which said PPP session is received; and selecting a tunnel based on said time.

12. The method of claim 6 wherein said selecting further comprises:

determining the time at which said PPP session is received;

determining the available bandwidth for at least one tunnel to said remote domain; and selecting a tunnel having the most available bandwidth at said time.

13. The method of claim 6 wherein said selecting further comprises:
   examining Type of Service (ToS) bits associated with said PPP session;
   determining the available bandwidth for at least one tunnel to said remote domain; and
   selecting a tunnel based on said ToS bits and said available bandwidth.

14. The method of claim 6 wherein said selecting further comprises:
   examining a Virtual Path Identifier (VPI)/Virtual Channel Identifier (VCI) pair associated with said PPP session;
   determining a class of service based on said VPI/VCI pair;
   determining the available bandwidth for at least one tunnel to said remote domain; and
   selecting a tunnel based on said class of service and said available bandwidth.

15. The method of claim 6 wherein said selecting further comprises selecting a tunnel to said remote domain having the smallest number of tunneled sessions such that tunneled sessions are distributed evenly among tunnels to said remote domain.

16. A program storage device readable by a machine, embodying a program of instructions executable by the machine to perform a method to load share between tunnels connecting communication networks, the method comprising:
   initializing a tunnel database that includes tunnel selection criteria for at least one tunnel connecting a first communication network to at least one communication network;
   after said initializing, receiving a communication from a subscriber using said first communication network;
   determining said tunnel selection criteria for said communication, said tunnel selection criteria indicating the basis for selecting one of said at least one tunnel;
   ascertaining one or more available tunnels to a remote domain for said communication;
   selecting one of said one or more available tunnels based on said tunnel selection criteria; and
   forwarding said communication on the selected tunnel.

17. The program storage device of claim 16 wherein said communication comprises a Point-to-Point Protocol (PPP) session.

18. The program storage device of claim 17 wherein said tunnels comprise L2TP tunnels.

19. A program storage device readable by a machine, embodying a program of instructions executable by the machine to perform a method to load share between tunnels connecting communication networks, the method comprising:
   receiving a communication from a subscriber using a first communication network;
   determining tunnel selection criteria for said communication, said tunnel selection criteria indicating the basis for selecting one of at least one tunnel connecting said first communication network to at least one communication network comprising a remote domain, said tunnel selection criteria stored in a previously initialized tunnel database;
   selecting one of said at least one tunnel based on said tunnel selection criteria; and
   forwarding said communication on the selected tunnel.

20. The program storage device of claim 19 wherein said communication comprises a Point-to-Point Protocol (PPP) session.

21. The program storage device of claim 20 wherein said tunnels comprise L2TP tunnels.

22. The program storage device of claim 21 wherein said selecting further comprises:
   examining Type of Service (ToS) bits associated with said PPP session; and
   selecting a tunnel based on said ToS bits.

23. The program storage device of claim 21 wherein said selecting further comprises:
   examining a Virtual Path Identifier (VPI)/Virtual Channel Identifier (VCI) pair associated with said PPP session; and
   selecting a tunnel based on said VPI/VCI pair.

24. The program storage device of claim 21 wherein said selecting further comprises randomly selecting a tunnel connected to said remote domain.

25. The program storage device of claim 21 wherein said selecting further comprises:
   determining the available bandwidth for at least one tunnel to said remote domain; and
   selecting a tunnel to said remote domain having the most available bandwidth.

26. The program storage device of claim 21 wherein said selecting further comprises:
   determining a time at which said PPP session is received; and
   selecting a tunnel based on said time.

27. The program storage device of claim 21 wherein said selecting further comprises:
   determining the time at which said PPP session is received;
   determining the available bandwidth for at least one tunnel to said remote domain; and
   selecting a tunnel having the most available bandwidth at said time.

28. The program storage device of claim 21 wherein said selecting further comprises:
   examining Type of Service (ToS) bits associated with said PPP session;
   determining the available bandwidth for at least one tunnel to said remote domain; and
   selecting a tunnel based on said ToS bits and said available bandwidth.

29. The program storage device of claim 21 wherein said selecting further comprises:
   examining a Virtual Path Identifier (VPI)/Virtual Channel Identifier (VCI) pair associated with said PPP session;
   determining a class of service based on said VPI/VCI pair;
   determining the available bandwidth for at least one tunnel to said remote domain; and
   selecting a tunnel based on said class of service and said available bandwidth.

30. The program storage device of claim 21 wherein said selecting further comprises selecting a tunnel to said remote domain having the smallest number of tunneled sessions such that tunneled sessions are distributed evenly among tunnels to said remote domain.

31. An apparatus for load sharing between tunnels connecting communication networks, the apparatus comprising:
   means for initializing a tunnel database that includes tunnel selection criteria for at least one tunnel connecting a first communication network to at least one communication network;

means for after said initializing, receiving a communication from a subscriber using said first communication network;

means for determining said tunnel selection criteria for said communication, said tunnel selection criteria indicating the basis for selecting one of said at least one tunnel;

means for ascertaining one or more available tunnels to a remote domain for said communication;

means for selecting one of said one or more available tunnels based on said tunnel selection criteria; and means for forwarding said communication on the selected tunnel.

32. The apparatus of claim 31 wherein said communication comprises a Point-to-Point Protocol (PPP) session.

33. The apparatus of claim 32 wherein said tunnels comprise L2TP tunnels.

34. An apparatus for load sharing between tunnels connecting communication networks, the apparatus comprising:

means for receiving a communication from a subscriber using a first communication network;

means for determining tunnel selection criteria for said communication, said tunnel selection criteria indicating the basis for selecting one of at least one tunnel connecting said first communication network to at least one communication network comprising a remote domain, said tunnel selection criteria stored in a previously initialized tunnel database;

means for selecting one of said at least one tunnel based on said tunnel selection criteria; and means for forwarding said communication on the selected tunnel.

35. The apparatus of claim 34 wherein said communication comprises a Point-to-Point Protocol (PPP) session.

36. The apparatus of claim 35 wherein said tunnels comprise L2TP tunnels.

37. The apparatus of claim 36 wherein said means for selecting further comprises:

means for examining Type of Service (ToS) bits associated with said PPP session; and means for selecting a tunnel based on said ToS bits.

38. The apparatus of claim 36 wherein said means for selecting further comprises:

means for examining a Virtual Path Identifier (VPI)/ Virtual Channel Identifier (VCI) pair associated with said PPP session; and means for selecting a tunnel based on said VPI/VCI pair.

39. The apparatus of claim 36 wherein said means for selecting further comprises means for randomly selecting a tunnel connected to said remote domain.

40. The apparatus of claim 36 wherein said means for selecting further comprises:

means for determining the available bandwidth for at least one tunnel to said remote domain; and means for selecting a tunnel to said remote domain having the most available bandwidth.

41. The apparatus of claim 36 wherein said means for selecting further comprises:

means for determining a time at which said PPP session is received; and means for selecting a tunnel based on said time.

42. The apparatus of claim 36 wherein said means for selecting further comprises:

means for determining the time at which said PPP session is received;

means for determining the available bandwidth for at least one tunnel to said remote domain; and means for selecting a tunnel having the most available bandwidth at said time.

43. The apparatus of claim 36 wherein said means for selecting further comprises:

means for examining Type of Service (ToS) bits associated with said PPP session;

means for determining the available bandwidth for at least one tunnel to said remote domain, and means for selecting a tunnel based on said ToS bits and said available bandwidth.

44. The apparatus of claim 36 wherein said means for selecting further comprises:

means for examining a Virtual Path Identifier (VPI)/ Virtual Channel Identifier (VCI) pair associated with said PPP session;

means for determining a class of service based on said VPI/VCI pair;

means for determining the available bandwidth for at least one tunnel to said remote domain; and means for selecting a tunnel based on said class of service and said available bandwidth.

45. The apparatus of claim 36 wherein said means for selecting further comprises means for selecting a tunnel to said remote domain having the smallest number of tunneled sessions such that tunneled sessions are distributed evenly among tunnels to said remote domain.

46. An apparatus for load sharing between tunnels connecting communication networks, the apparatus comprising:

a tunnel database initializer to initialize a tunnel database that includes tunnel selection criteria for at least one tunnel connecting a first communication network to at least one communication network;

a receiving interface to receive a communication from a subscriber using said first communication network after said tunnel database is initialized;

a tunnel selection criteria determiner to determine tunnel said selection criteria for said communication, said tunnel selection criteria indicating the basis for selecting one of said at least one tunnel;

an available tunnel ascertainer to ascertain one or more available tunnels to a remote domain for said communication;

a tunnel selector to select one of said one or more available tunnels based on said tunnel selection criteria; and a session forwarder to forward said communication on the selected tunnel.

47. The apparatus of claim 46 wherein said communication comprises a Point-to-Point Protocol (PPP) session.

48. The apparatus of claim 47 wherein said tunnels comprise L2TP tunnels.

49. An apparatus for load sharing between tunnels connecting communication networks, the apparatus comprising:

a receiving interface to receive a communication from a subscriber using a first communication network;

a tunnel selection criteria determiner to determine tunnel selection criteria for said communication, said tunnel selection criteria indicating the basis for selecting one of at least one tunnel connecting said first communication network to at least one communication network comprising a remote domain, said tunnel selection criteria stored in a previously initialized tunnel database;

a tunnel selector to select one of said at least one tunnel based on said tunnel selection criteria; and a session forwarder to forward said communication on the selected tunnel.

50. The apparatus of claim 49 wherein said communication comprises a Point-to-Point Protocol (PPP) session.

51. The apparatus of claim 50 wherein said tunnels comprise L2TP tunnels.

52. The apparatus of claim 51 wherein said tunnel selector is further configured to select a tunnel based upon Type of Service (ToS) bits associated with said PPP session.

53. The apparatus of claim 51 wherein said tunnel selector is further configured to select a tunnel based upon a Virtual Path Identifier (VPI)/Virtual Channel Identifier (VCI) pair associated with said PPP session.

54. The apparatus of claim 51 wherein said tunnel selector is further configured to select a tunnel to said remote domain based a pseudo-random process.

55. The apparatus of claim 51 wherein said tunnel selector is further configured to select a tunnel based upon the available bandwidth for at least one tunnel to said remote domain.

56. The apparatus of claim 51 wherein said tunnel selector is further configured to select a tunnel based upon the time at which a PPP session is received.

57. The apparatus of claim 51 wherein said tunnel selector is further configured to select a tunnel based upon which tunnel has the most available bandwidth when said PPP session is received.

58. The apparatus of claim 51 wherein said tunnel selector is further configured to select a tunnel based upon Type of Service (ToS) bits associated with said PPP session and upon the available bandwidth for at least one tunnel to said remote domain.

59. The apparatus of claim 51 wherein said tunnel selector is further configured to select a tunnel based upon a Virtual Path Identifier (VPI)/Virtual Channel Identifier (VCI) pair associated with said PPP session and upon the available bandwidth for at least one tunnel to said remote domain.

60. The apparatus of claim 51 wherein said tunnel selector is further configured to select a tunnel having the smallest number of tunneled sessions to said remote domain such that tunneled sessions are distributed evenly among tunnels to said remote domain.

61. A method for load sharing between tunnels connecting communication networks, the method comprising:
receiving a Point-to-Point Protocol (PPP) session from a subscriber using a first communication network;
determining tunnel selection criteria for said PPP session, said tunnel selection criteria indicating a basis for randomly selecting one of at least one L2TP tunnel connecting said first communication network to at least one communication network comprising a remote domain;
selecting one of said at least one L2TP tunnel based on said tunnel selection criteria; and
forwarding said PPP session on the selected tunnel.

62. A program storage device readable by a machine, embodying a program of instructions executable by the machine to perform a method to load share between tunnels connecting communication networks, the method comprising:
receiving a Point-to-Point Protocol (PPP) session from a subscriber using a first communication network;
determining tunnel selection criteria for said PPP session, said tunnel selection criteria indicating a basis for randomly selecting one of at least one L2TP tunnel connecting said first communication network to at least one communication network comprising a remote domain;
selecting one of said at least one L2TP tunnel based on said tunnel selection criteria; and
forwarding said PPP session on the selected tunnel.

63. An apparatus for load sharing between tunnels connecting communication networks, the apparatus comprising:
means for receiving a Point-to-Point Protocol (PPP) session from a subscriber using a first communication network;
means for determining tunnel selection criteria for said PPP session, said tunnel selection criteria indicating a basis for randomly selecting one of at least one L2TP tunnel connecting said first communication network to at least one communication network comprising a remote domain;
means for selecting one of said at least one L2TP tunnel based on said tunnel selection criteria; and
means for forwarding said PPP session on the selected tunnel.

64. An apparatus for load sharing between tunnels connecting communication networks, the apparatus comprising:
a receiving interface to receive a Point-to-Point Protocol (PPP) session from a subscriber using a first communication network;
a tunnel selection criteria determiner to determine tunnel selection criteria for said PPP session, said tunnel selection criteria indicating a basis for randomly selecting one of at least one L2TP tunnel connecting said first communication network to at least one communication network comprising a remote domain;
a tunnel selector to select one of said at least one L2TP tunnel based on said tunnel selection criteria; and
a session forwarder to forward said PPP session on the selected tunnel.

65. A method for load sharing between tunnels connecting communication networks, the method comprising:
receiving a communication from a subscriber using a first communication network, said communication comprising a Point-to-Point Protocol (PPP) session;
determining tunnel selection criteria for said communication, said tunnel selection criteria indicating the basis for selecting one of at least one L2TP tunnel connecting said first communication network to at least one communication network comprising a remote domain, said tunnel selection criteria based at least in part on one or more of:
one or more Type of Service (ToS) bits associated with said PPP session;
a Virtual Path Identifier (VPI)/Virtual Channel Identifier (VCI) pair associated with said PPP session;
the available bandwidth for at least one tunnel to said remote domain; and
a time at which said PPP session is received;
selecting one of said at least one L2TP tunnel based on said tunnel selection criteria; and
forwarding said communication on the selected tunnel.

66. The method of claim 65 wherein said selecting further comprises:
examining said one or more Type of Service (ToS) bits associated with said PPP session; and
selecting a tunnel based on said one or more ToS bits.

67. The method of claim 65 wherein said selecting further comprises:
examining a Virtual Path Identifier (VPI)/Virtual Channel Identifier (VCI) pair associated with said PPP session; and
selecting a tunnel based on said VPI/VCI pair.

68. The method of claim 65 wherein said selecting further comprises:
determining said available bandwidth for at least one tunnel to said remote domain; and
selecting a tunnel to said remote domain having said most available bandwidth.

69. The method of claim 65 wherein said selecting further comprises:
determining a time at which said PPP session is received; and
selecting a tunnel based on said time.

70. The method of claim 65 wherein said selecting further comprises:
determining said time at which said PPP session is received;
determining said available bandwidth for at least one tunnel to said remote domain; and
selecting a tunnel having said most available bandwidth at said time.

71. The method of claim 65 wherein said selecting further comprises:
examining one or more Type of Service (ToS) bits associated with said PPP session;
determining said available bandwidth for at least one tunnel to said remote domain; and
selecting a tunnel based on said ToS bits and said available bandwidth.

72. The method of claim 65 wherein said selecting further comprises:
examining a Virtual Path Identifier (VPI)/Virtual Channel Identifier (VCI) pair associated with said PPP session;
determining a class of service based on said VPI/VCI pair;
determining said available bandwidth for at least one tunnel to said remote domain; and
selecting a tunnel based on said class of service and said available bandwidth.

73. An apparatus for load sharing between tunnels connecting communication networks, the apparatus comprising:
means for receiving a communication from a subscriber using a first communication network, said communication comprising a Point-to-Point Protocol (PPP) session;
means for determining tunnel selection criteria for said communication, said tunnel selection criteria indicating the basis for selecting one of at least one L2TP tunnel connecting said first communication network to at least one communication network comprising a remote domain, said tunnel selection criteria based at least in part on one or more of:
one or more Type of Service (ToS) bits associated with said PPP session;
a Virtual Path Identifier (VPI)/Virtual Channel Identifier (VCI) pair associated with said PPP session;
the available bandwidth for at least one tunnel to said remote domain; and
a time at which said PPP session is received;
means for selecting one of said at least one L2TP tunnel based on said tunnel selection criteria; and
means for forwarding said communication on the selected tunnel.

74. An apparatus for load sharing between tunnels connecting communication networks, the apparatus comprising:
a receiving interface to receive a communication from a subscriber using a first communication network, said communication comprising a Point-to-Point Protocol (PPP) session;
a tunnel selection criteria determiner to determine tunnel selection criteria for said communication, said tunnel selection criteria indicating the basis for selecting one of at least one L2TP tunnel connecting said first communication network to at least one communication network comprising a remote domain, said tunnel selection criteria based at least in part on one or more of:
one or more Type of Service (ToS) bits associated with said PPP session;
a Virtual Path Identifier (VPI)/Virtual Channel Identifier (VCI) pair associated with said PPP session;
the available bandwidth for at least one tunnel to said remote domain; and
a time at which said PPP session is received;
a tunnel selector to select one of said at least one tunnel based on said tunnel selection criteria; and
a session forwarder to forward said communication on the selected tunnel.

75. The apparatus of claim 74 wherein said tunnel selector is further configured to:
examine said one or more Type of Service (ToS) bits associated with said PPP session; and
select a tunnel based on said ToS bits.

76. The apparatus of claim 74 wherein said tunnel selector is further configured to:
examine said Virtual Path Identifier (VPI)/Virtual Channel Identifier (VCI) pair associated with said PPP session; and
select a tunnel based on said VPI/VCI pair.

77. The apparatus of claim 74 wherein said tunnel selector is further configured to:
determine said available bandwidth for at least one tunnel to said remote domain; and
select a tunnel to said remote domain having said most available bandwidth.

78. The apparatus of claim 74 wherein said tunnel selector is further configured to:
determine said time at which said PPP session is received; and
select a tunnel based on said time.

79. The apparatus of claim 74 wherein said tunnel selector is further configured to:
determine said time at which said PPP session is received;
determine said available bandwidth for at least one tunnel to said remote domain; and
select a tunnel having said most available bandwidth at said time.

80. The apparatus of claim 74 wherein said tunnel selector is further configured to:
examine Type of Service (ToS) bits associated with said PPP session;
determine said available bandwidth for at least one tunnel to said remote domain; and
select a tunnel based on said ToS bits and said available bandwidth.

81. The apparatus of claim 74 wherein said tunnel selector is further configured to:
examine a Virtual Path Identifier (VPI)/Virtual Channel Identifier (VCI) pair associated with said PPP session;
determine a class of service based on said VPI/VCI pair;
determine said available bandwidth for at least one tunnel to said remote domain; and
select a tunnel based on said class of service and said available bandwidth.

* * * * *